(12) United States Patent
Sykes

(10) Patent No.: US 11,844,461 B1
(45) Date of Patent: Dec. 19, 2023

(54) CAMPFIRE ROASTER

(71) Applicant: Jonathan Scott Sykes, Clarksville, TN (US)

(72) Inventor: Jonathan Scott Sykes, Clarksville, TN (US)

(*) Notice: Subject to any disclaimer, the term of this patent is extended or adjusted under 35 U.S.C. 154(b) by 591 days.

(21) Appl. No.: 17/154,636

(22) Filed: Jan. 21, 2021

Related U.S. Application Data

(63) Continuation of application No. 16/033,706, filed on Jul. 12, 2018, now abandoned.

(51) Int. Cl.
*A47J 37/04* (2006.01)
*A47J 37/07* (2006.01)
*A47J 43/18* (2006.01)

(52) U.S. Cl.
CPC ........... *A47J 37/04* (2013.01); *A47J 37/0786* (2013.01); *A47J 43/18* (2013.01)

(58) Field of Classification Search
CPC ......... A47J 43/18; A47J 37/0786; A47J 37/04
USPC ...................................................... 99/421 A
See application file for complete search history.

(56) References Cited

U.S. PATENT DOCUMENTS

| | | | | |
|---|---|---|---|---|
| 489,056 A * | 1/1893 | Westheimer | ........ | A47J 37/0694 99/397 |
| 6,196,121 B1 * | 3/2001 | Crowl | ...................... | A47J 43/18 99/421 A |
| 6,286,418 B1 * | 9/2001 | Berke | ...................... | A47J 43/18 99/421 A |
| 8,387,519 B2 * | 3/2013 | McGuigan | .......... | A47J 37/0786 221/199 |
| 8,960,083 B2 * | 2/2015 | Wong | ................... | A47J 37/0763 99/449 |
| D957,212 S * | 7/2022 | Cloutier | ......................... | D7/683 |
| 2009/0301314 A1 * | 12/2009 | McGuigan | ............ | A47J 43/283 99/421 A |
| 2016/0081514 A1 * | 3/2016 | Cauble | .................... | A47J 33/00 99/421 A |
| 2016/0174760 A1 * | 6/2016 | Criner | ..................... | A47J 33/00 99/421 A |
| 2021/0353106 A1 * | 11/2021 | Ababi | ..................... | A47J 37/04 |

* cited by examiner

*Primary Examiner* — Sean M Michalski
(74) *Attorney, Agent, or Firm* — Shane Cortesi

(57) ABSTRACT

A roaster for roasting food over a campfire is disclosed. The roaster may include one or more prongs located at the roaster forward end, a knob located at the roaster rear end, a rod attached to the knob, a dispensing plate slideably mounted on the prong(s) and attached to the rod, a longitudinal tube attached to the prong(s), a forward handle, a rear handle, and a spring between the knob and the rear handle and surrounding the rod. The rod may pass fully through the forward and rear handles and the longitudinal tube. The longitudinal tube may pass fully through the forward handle and only partially through the rear handle. Moving the knob and attached rod forwardly may cause the dispensing plate to move along the prong(s). The rear handle, the longitudinal tube, the prong(s), and the dispensing plate rotate relative to the forward handle.

20 Claims, 7 Drawing Sheets

CAMPFIRE ROASTER

RELATED APPLICATIONS

The present application is a continuation of U.S. patent application Ser. No. 16/033,706, filed Jul. 12, 2018, the contents of which are incorporated herein by reference in their entirety.

BACKGROUND

TECHNICAL FIELD

The present invention relates to roasters for grilling hot dogs, sausages and marshmallows and other food over a campfire.

BACKGROUND OF THE INVENTION

Roasting sticks are known. Generally, they include a rod with a rear end held by a user and a forward end configured to hold a food item for roasting over a campfire.

U.S. Pat. No. 1,172,333 describes a fork with a plate slideably mounted on the prongs. A rod is used to slide the plate forwardly. According to the patent, the device is said to be useful to remove food items that cling to the prongs. As best understood, the described fork may be difficult to use, as the handle is a conventional handle.

Therefore, there is a need for new roasters that are easy-to-use and allow for the dispensing of food items.

BRIEF SUMMARY

The present disclosure provides campfire roasters as described herein.

In some embodiments, the campfire roaster includes a roaster forward end; a roaster rear end; a roaster length extending from the roaster forward end to the roaster rear end. The campfire roaster may further include at least one prong configured to hold a food item, the at least one prong having a prong forward end adjacent to the roaster forward end and a prong rear end. The campfire roaster may further include a rod having a rod forward end, a rod rear end, a rod length extending from the rod forward end to the rod rear end and generally parallel to the roaster length, and a rod width perpendicular to the rod length. The campfire roaster may further include a knob located adjacent to the rod rear end and the roaster rear end. The campfire roaster may further include a rear handle surrounding the rod, located forwardly relative to the knob and having a rear handle forward end, a rear handle rear end, a rear handle length extending from the rear handle forward end to the rear handle rear end and generally parallel to the roaster length, and a rear handle channel having a rear handle channel length extending from the rear handle forward end to the rear handle rear end and generally parallel to the roaster length. The campfire roaster may further include a spring located between the rear handle and the knob, the spring surrounding the rod and having a relaxed length and a compressed length, the relaxed length and the compressed length generally parallel to the roaster length, the relaxed length greater than the compressed length. The campfire roaster may further include a forward handle surrounding the rod, located forwardly relative to the rear handle and having a forward handle forward end, a forward handle rear end, a forward handle length extending from the forward handle forward end to the forward handle rear end and generally parallel to the roaster length, and a forward handle channel having a forward handle channel length extending from the forward handle forward end to the forward handle rear end and generally parallel to the roaster length. The campfire roaster may further include a longitudinal tube comprising a longitudinal tube forward end, a longitudinal tube rear end, a longitudinal tube length extending from the longitudinal tube forward end to the longitudinal tube rear end, the longitudinal tube comprising a longitudinal tube channel having a longitudinal tube channel length extending from the longitudinal tube channel forward end to the longitudinal channel rear end and generally parallel to the roaster length. The campfire roaster may further include a dispensing plate attached to the rod adjacent to the rod forward end and slideably mounted on the at least one prong, the dispensing plate having at least one aperture receiving the at least one prong, the dispensing plate located forwardly relative to the longitudinal tube, the dispensing plate not attached to the longitudinal tube, the dispensing plate oriented generally perpendicular to the roaster length and the at least one prong. Optionally, the rod fully passes through the forward handle channel and the rear handle channel. Optionally, the longitudinal tube passes at least partially (preferably only partially) through the rear handle channel and fully through the forward handle channel. Optionally, the at least one prong is attached to the longitudinal tube. Optionally, the rod length is greater than the longitudinal tube length and the rod passes fully through the longitudinal tube channel. Optionally, the rear handle, the longitudinal tube, the at least one prong, and the dispensing plate are configured to rotate together relative to the forward handle. In other words, optionally, the longitudinal tube is configured to rotate within the forward handle channel so that rotation of the longitudinal tube (which is caused by rotation of the rear handle) does not cause the forward handle to rotate. Optionally, moving the knob forwardly towards the rear handle is configured to i) move the rod forwardly, ii) move the spring from the relaxed length to the compressed length; and iii) move the dispensing plate forwardly along the at least one prong. Optionally, the longitudinal tube comprises a forward flange located directly in front of the forward handle, the forward flange configured to prevent the forward handle from moving forwardly beyond the forward flange. Optionally, the campfire roaster further includes a washer located between the forward handle and the rear handle, the washer comprising a washer aperture, the longitudinal tube and rod positioned through the washer aperture. Optionally, the roaster comprises two prongs attached to opposite sides of the longitudinal tube and further wherein the rod is located between the two prongs. Optionally, the two prongs are located approximately 180 degrees apart. Optionally, each prong comprises a curved rear segment attached to the longitudinal tube and a straight forward segment located forwardly relative to the curved rear segment. Optionally, the straight forward segments of the two prongs are generally parallel to each other and to the roaster length. Optionally, the rear and forward handle are comprised of an insulated material. Optionally, the rear handle channel is wider at the rear handle forward end as compared to the rear handle rear end. Optionally, the forward handle and the rear handle are generally tubular in shape. Optionally, the rear handle, the longitudinal tube, the at least one prong, the rod and the dispensing plate are configured to rotate together in a clockwise and counterclockwise fashion relative to the roaster length. Optionally, the rod length is at least 2 inches longer than the longitudinal tube length. Optionally, the prong rear end is attached to the longitudinal tube. Optionally, the rear handle channel and the forward channel each comprise a width generally parallel to the rod width and further wherein the forward handle channel width is greater than the rear handle channel width, which allows the longitudinal tube to rotate within the forward handle channel.

In still further embodiments, the present disclosure provides a method of roasting a food item comprising: a) providing the campfire roaster; b) positioning a food item on the at least one prong; and c) positioning the food item over a fire. Optionally, the method further includes, after step c), moving the knob forwardly towards the rear handle to move the rod forwardly, move the spring from the relaxed length to the compressed length, and move the dispensing plate forwardly along the at least one prong to remove the food item from the at least one prong. Optionally, the method further comprises the step of rotating the rear handle, the longitudinal tube, the at least one prong, and the dispensing plate clockwise or counter-clockwise relative to the roaster length while keeping the forward handle stationary.

In still further embodiments, the present disclosure provides a campfire roaster comprising: a roaster forward end; a roaster rear end; a roaster length extending from the roaster forward end to the roaster rear end. Optionally, the campfire roaster further includes at least one prong configured to hold a food item, the at least one prong having a prong forward end adjacent to the roaster forward end and a prong rear end. Optionally, the campfire roaster further includes a rod having a rod forward end, a rod rear end, a rod length extending from the rod forward end to the rod rear end and generally parallel to the roaster length, and a rod width perpendicular to the rod length. Optionally, the campfire roaster further includes a knob located adjacent to the rod rear end and the roaster rear end. Optionally, the campfire roaster further includes a rear handle surrounding the rod, located forwardly relative to the knob and having a rear handle forward end, a rear handle rear end, a rear handle length extending from the rear handle forward end to the rear handle rear end and generally parallel to the roaster length, and a rear handle channel having a rear handle channel length extending from the rear handle forward end to the rear handle rear end and generally parallel to the roaster length. Optionally, the campfire roaster further includes a spring located between the rear handle and the knob, the spring surrounding the rod and having a relaxed length and a compressed length, the relaxed length and the compressed length generally parallel to the roaster length, the relaxed length greater than the compressed length. Optionally, the campfire roaster further includes a forward handle surrounding the rod, located forwardly relative to the rear handle and having a forward handle forward end, a forward handle rear end, a forward handle length extending from the forward handle forward end to the forward handle rear end and generally parallel to the roaster length, and a forward handle channel having a forward handle channel length extending from the forward handle forward end to the forward handle rear end and generally parallel to the roaster length. Optionally, the campfire roaster further includes a longitudinal tube comprising a longitudinal tube forward end, a longitudinal tube rear end, a longitudinal tube length extending from the longitudinal tube forward end to the longitudinal tube rear end, the longitudinal tube comprising a longitudinal tube channel. Optionally, the campfire roaster further includes a dispensing plate attached to the rod adjacent to the rod forward end and slideably mounted on the at least one prong, the dispensing plate having at least one aperture receiving the at least one prong, the dispensing plate located forwardly relative to the longitudinal tube, the dispensing plate not attached to the longitudinal tube, the dispensing plate oriented generally perpendicular to the roaster length and the at least one prong. Optionally, the rod fully passes through the forward handle channel and the rear handle channel. Optionally, the longitudinal tube passes at least partially through the forward handle channel. Optionally, the at least one prong is attached to the longitudinal tube. Optionally, the rod length is greater than the longitudinal tube length and the rod passes fully through the longitudinal tube channel. Optionally, the forward handle, the longitudinal tube, the at least one prong, and the dispensing plate are configured to rotate together relative to the rear handle. Optionally, moving the knob forwardly towards the rear handle is configured to i) move the rod forwardly, ii) move the spring from the relaxed length to the compressed length; and iii) move the dispensing plate forwardly along the at least one prong. Optionally, the forward handle, the longitudinal tube, the at least one prong, the rod and the dispensing plate are configured to rotate together in a clockwise and counterclockwise fashion relative to the roaster length. Optionally, the forward handle channel is wider at the forward handle forward end as compared to the forward handle rear end. The campfire roaster may include one or more features of the prior embodiment, including without limitation, the washer, the forward flange, two prongs, prongs with curved and straight segments, insulated and/or tubular handles, and may be used in the aforementioned method.

BRIEF DESCRIPTION OF THE DRAWINGS

in FIG. 4, an arrow illustrates how the knob, the rod and the dispensing plate have moved forwardly.

DETAILED DESCRIPTION

Figures 1, 2:
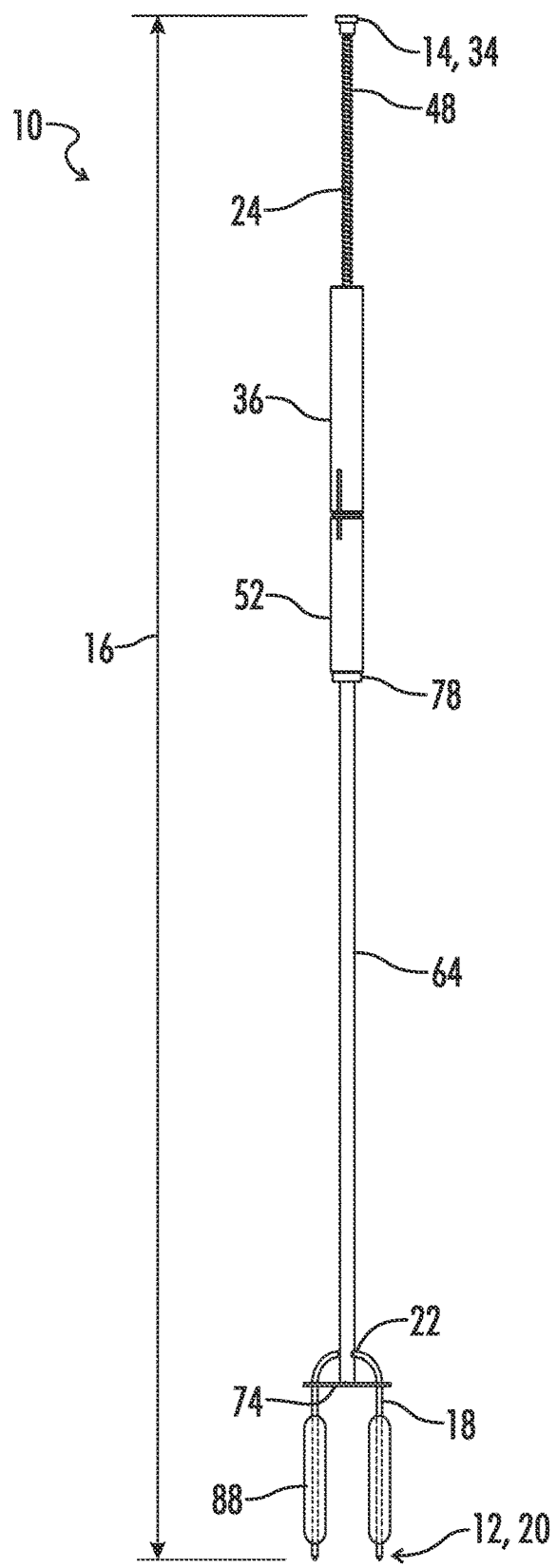
FIG. 1 illustrates a top perspective view of a campfire roaster of one embodiment of the present invention with the spring at the relaxed spring length.
FIG. 2 illustrates a top perspective view of the campfire roaster of FIG. 1 with the spring at the compressed spring length and the knob, the rod and the dispensing plate moved forwardly relative to FIG. 1.

With reference to FIGS. 1 - 11 the present invention provides a campfire roaster, designated by the numeral 10. In the drawings, not all reference numbers are included in each drawing for the sake of clarity. In addition, although other dimensions are possible, FIGS. 1-11 are CAD drawings, drawn to scale.

Referring to FIGS. 1-11, the campfire roaster 10 may include a roaster forward end 12, a roaster rear end 14, a roaster length/longitudinal axis 16 extending from the roaster forward end 12 to the roaster rear end 14, and at least one prong 18 configured to hold a food item 88, the at least one prong 18 having a prong forward end 20 adjacent to the roaster forward end 12 and a prong rear end 22. Preferably, the prong(s) forward end(s) 20 are pointed to pierce the hot dog, sausage or other food item 88. The prong(s) 18 may be comprised of any suitable material including metal.

The campfire roaster 10 (also referred to herein as a roaster 10) may further include a rod 24 having a rod forward end 26, a rod rear end 28, a rod length 30 extending from the rod forward end 26 to the rod rear end 28 and generally parallel to the roaster length/longitudinal axis 16, and a rod width 32 perpendicular to the rod length 30. The rod 24 may be comprised of any suitable material including metal.

Figure 6:
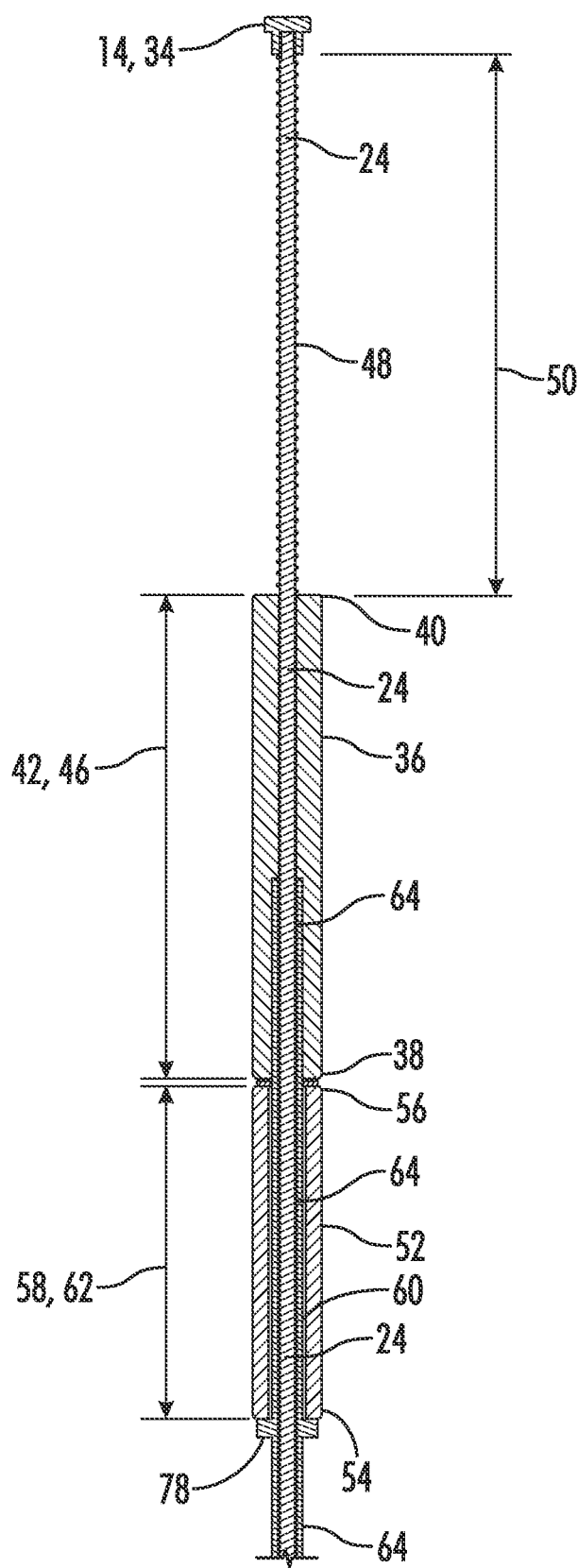
FIG. 6 illustrates a top perspective, cross-sectional view of the rear portion of the campfire roaster of FIG. 1 with the spring at the relaxed spring length.
Figure 7:
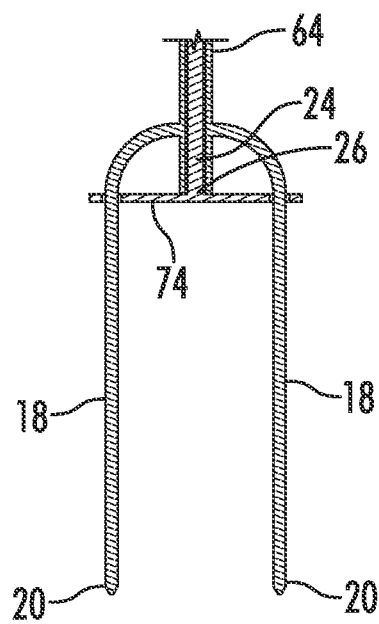
FIG. 7 illustrates a top perspective, cross-sectional view of the forward portion of the campfire roaster of FIG. 1 with the spring at the relaxed spring length.
Figure 8:
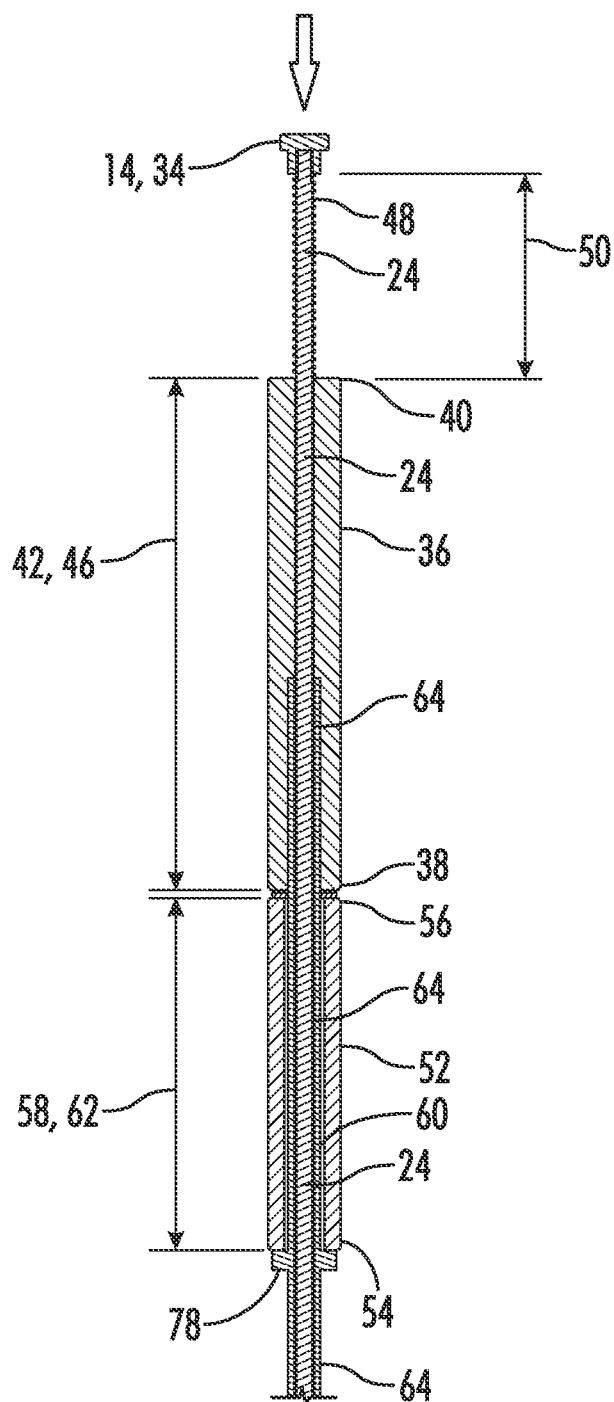
FIG. 8 illustrates a top perspective, cross-sectional view of the rear portion of the campfire roaster of FIG. 1 with the spring at the compressed spring length and the knob, the rod and the dispensing plate moved forwardly relative to FIG. 6.
Figure 9:
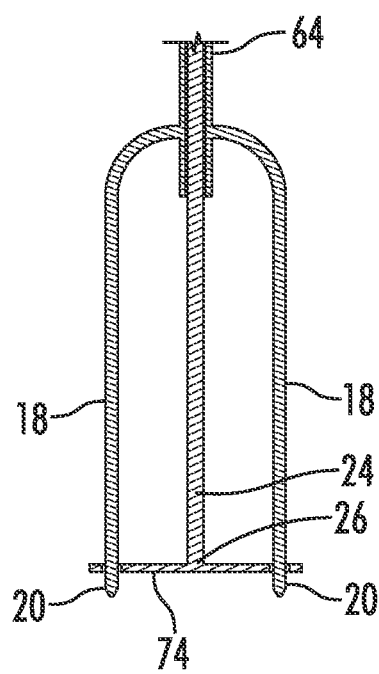
FIG. 9 illustrates a top perspective, cross-sectional view of the forward portion of the campfire roaster of FIG. 1 with the spring at the compressed spring length and the knob, the rod and the dispensing plate moved forwardly relative to FIG. 7.
Figure 10:
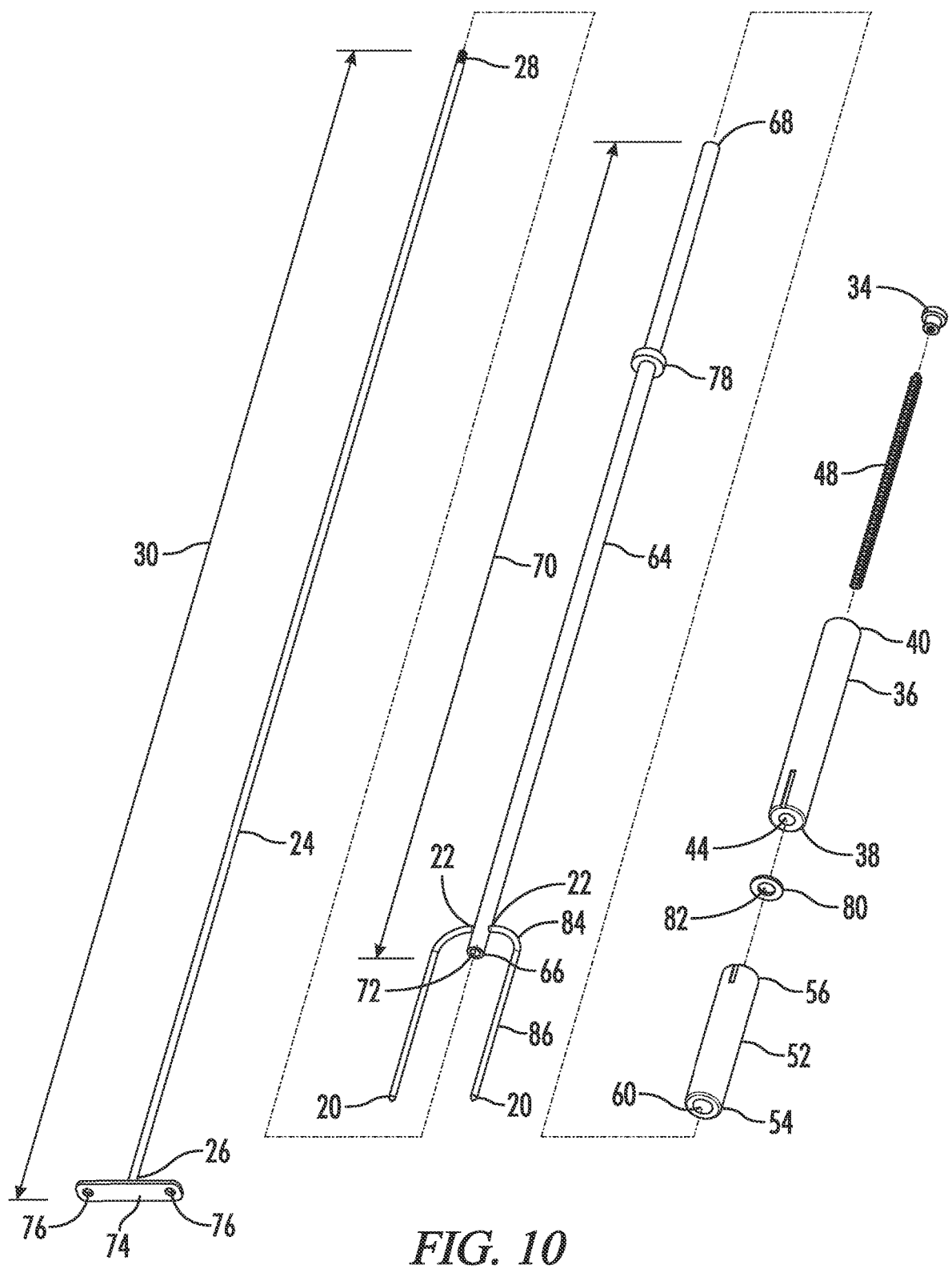
FIG. 10 illustrates an isometric exploded view of the campfire roaster of FIG. 1.

The roaster 10 may further include a knob 34 located adjacent to (i.e., at or near) the rod rear end 28 and the roaster rear end 14. In the illustrated embodiments, the knob 34 is screwed onto the rod rear end 28, as best seen in FIGS. 6, 8 and 10.

The roaster 10 may further include a rear handle 36 that surrounds the rod 24, is located forwardly relative to the knob 34, and has a rear handle forward end 38, a rear handle rear end 40, a rear handle length 42 extending from the rear handle forward end 38 to the rear handle rear end 40 and generally parallel to the roaster length/longitudinal axis 16, and a rear handle channel 44 having a rear handle channel length 46 extending from the rear handle forward end 38 to the rear handle rear end 40 and generally parallel to the roaster length/longitudinal axis 16. The rear handle 36 is preferably tubular in shape and is preferably insulated so as to provide user comfort while the user holds the rear handle 36 when the prong 18 and food item 88 is over a fire. The rear handle forward end 38 and rear handle rear end 40 are preferably open and lead into the rear handle channel 44. Thus, the rear handle channel length 46 is preferably equal to the rear handle length 42.

The roaster 10 may further include a spring 48 located between the rear handle 36 and the knob 34. The spring 48 may surround the rod 24 and have a relaxed length (see FIGS. 1, 3 and 6 for example) and a compressed length (see FIGS. 2, 4 and 8, for example), the relaxed length and the compressed length generally parallel to the roaster length/longitudinal axis 16, the relaxed length greater than the compressed length. (Both the relaxed and compressed spring lengths are denoted by the numeral 50). The forward end of the spring 48 may abut the rear handle 36 and the rear end of the spring 48 may abut the knob 34, at least when the spring is at the relaxed spring length.

The roaster 10 may further include a forward handle 52 that surrounds the rod 24, is located forwardly relative to the rear handle 36 (i.e., located closer to the prong(s) 18 than the rear handle 36) and has a forward handle forward end 54, a forward handle rear end 56, a forward handle length 58 extending from the forward handle forward end 54 to the forward handle rear end 56 and generally parallel to the roaster length/longitudinal axis 16, and a forward handle channel 60 having a forward handle channel length 62 extending from the forward handle forward end 54 to the forward handle rear end 56 and generally parallel to the roaster length/longitudinal axis 16. The forward handle 52 is preferably tubular in shape and is preferably insulated so as to provide user comfort while the user holds the forward handle 52 when the prong 18 and food item 88 is over a fire. The forward handle forward end 54 and forward handle rear end 56 are preferably open and lead into the forward handle channel 60. Thus, the forward handle channel length 62 is preferably equal to the forward handle length 58.

The roaster 10 may further include a longitudinal tube 64 comprising a longitudinal tube forward end 66, a longitudinal tube rear end 68, a longitudinal tube length 70 extending from the longitudinal tube open forward end 66 to the longitudinal tube open rear end 68, the longitudinal tube 64 comprising a longitudinal tube channel 72. The longitudinal tube forward end 66 and the longitudinal tube rear end 68 are preferably open and lead into the longitudinal tube channel 72. Thus, the length of the longitudinal tube channel 72 is preferably equal to the longitudinal tube length 70.

The roaster 10 may further include a dispensing plate 74 attached to the rod 24 adjacent to the rod forward end 26 and slideably mounted on the at least one prong 18. The dispensing plate 74 may have at least one aperture 76 receiving the at least one prong 18 (i.e., allowing the at least one prong 18 to pass through the dispensing plate 74). As used herein, the word "attached" includes integral parts as well as, for example, parts that are joined by welding. The dispensing plate 74 may be located forwardly relative to the longitudinal tube 64. The dispensing plate 74 is preferably not attached to the longitudinal tube 64. The dispensing plate 74 is preferably oriented generally perpendicular to the roaster length/longitudinal axis 16 and the at least one prong 18.

Figure 5:
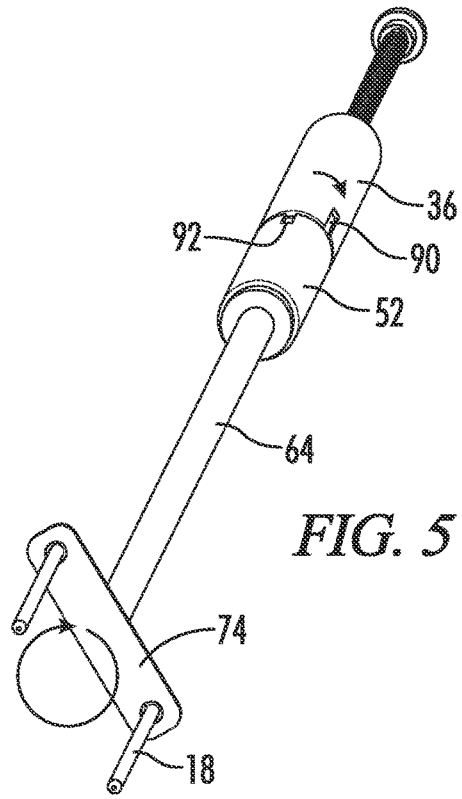
FIG. 5 illustrates a front perspective view of the campfire roaster of FIG. 1; as compared to FIG. 4, in FIG. 5 the rear handle, dispensing plate, longitudinal tube and prongs are rotated clockwise relative to the forward handle, as denoted by the arrow.

Preferably, the rod 24 fully passes through the forward handle channel 60 and the rear handle channel 44 (and thus both the forward and rear handles 52, 36). Preferably, the longitudinal tube 64 passes partially through the rear handle channel 44 and fully through the forward handle channel 60. In other words, preferably the longitudinal tube 64 passes fully through the forward handle 52 and partially through the rear handle 36). Preferably, the rear end of the at least one prong 18 is attached to the longitudinal tube 64 adjacent to the longitudinal tube forward end 66. Preferably, the rod length 30 is greater than the longitudinal tube length 70 and the rod 24 passes fully through the longitudinal tube channel 72 (i.e., from the longitudinal tube forward end 66 to the longitudinal tube rear end 68). Preferably, the rear handle 36, the longitudinal tube 64, the at least one prong 18, the dispensing plate 74, and the rod 24 are configured to rotate together counterclockwise and/or clockwise relative to the forward handle 52, as shown in FIG. 5 (which shows a clockwise rotation). The forward handle 52 and rear handle 36 are shown with indicia 90, 92 in the drawings to illustrate the rotation. Without being bound by any particular theory, the user may grasp the forward handle 52 in one hand and the rear handle 36 in his/her other hand and rotate the rear handle 36 counterclockwise or clockwise about the roaster length/longitudinal axis 16 while keeping the forward handle 52 stationary so as to rotate the food item 88 in the fire.

Figure 3:
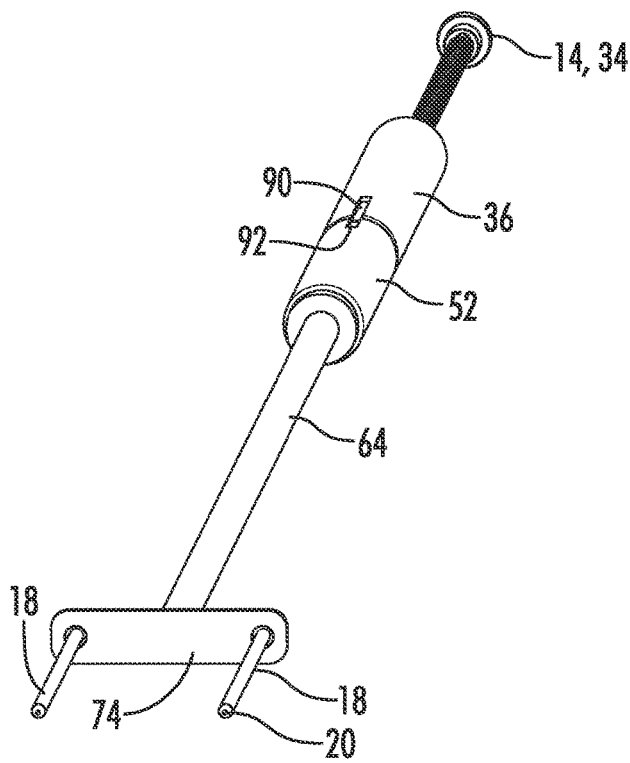
FIG. 3 illustrates a front perspective view of the campfire roaster of FIG. 1 with the spring at the relaxed spring length.
Figure 4:
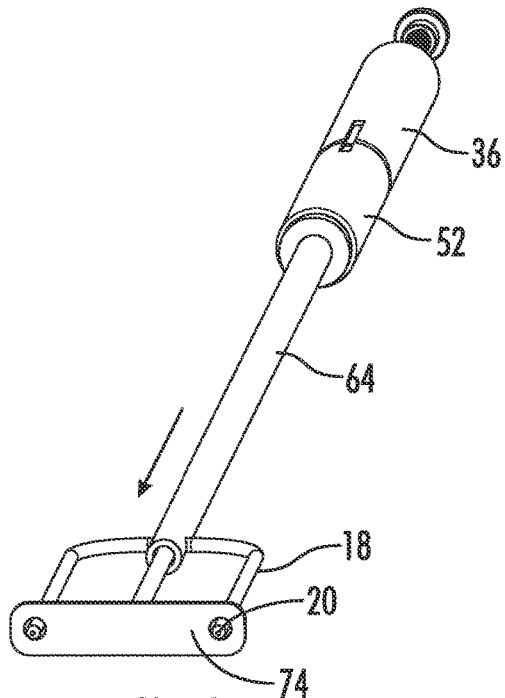
FIG. 4 illustrates a front perspective view of the campfire roaster of FIG. 1 with the spring at the compressed spring length and the knob, the rod and the dispensing plate moved forwardly relative to FIG. 3.

In addition, preferably, moving the knob 34 forwardly towards the rear handle 36 is configured to i) move the rod 24 forwardly, move the spring 48 from the relaxed length to the compressed length; and move the dispensing plate 74 forwardly along the at least one prong 18, as shown by comparing FIG. 2 with FIG. 1 and FIG. 4 with FIG. 3 for example, in order to remove the food item 88 from the prong 18 and onto a user's plate for example.

Preferably, the longitudinal tube 64 comprises a forward flange 78 located directly in front of the forward handle 52. The forward flange 78 is preferably wider than the forward handle channel 60 so as to prevent the forward handle 52 from moving forwardly beyond the forward flange 78. The roaster 10 may further include a washer 80 located between the forward handle 52 and the rear handle 36. The washer 80 may comprise a washer aperture 82, and the longitudinal tube 64 and rod 24 may be positioned through the washer aperture 82. Without being bound by any particular theory, the washer 80 may act as a bearing, allowing the rear handle 36 to be moved relative to the forward handle 52.

Preferably, as shown in the illustrations, the roaster 10 comprises two prongs 18 attached to opposite sides of the longitudinal tube 64 and the rod 24 is located between the two prongs 18. Preferably, the two prongs 18 are located approximately 180 degrees apart. Preferably, as shown in the illustrations, each prong 18 comprises a curved rear segment 84 attached to the longitudinal tube 64 and a straight forward segment 86 located forwardly relative to the curved rear segment 84. Preferably, the straight forward segments 86 of the two prongs 18 are generally parallel to each other and to the roaster length/longitudinal axis 16. Preferably, the rear and forward handle 36, 52 are comprised of an insulated material. For example, the rod 24 and prongs 18 may be metallic and the forward and rear handles 52, 36 are preferably not metallic, e.g., plastic or wooden.

Figure 11:
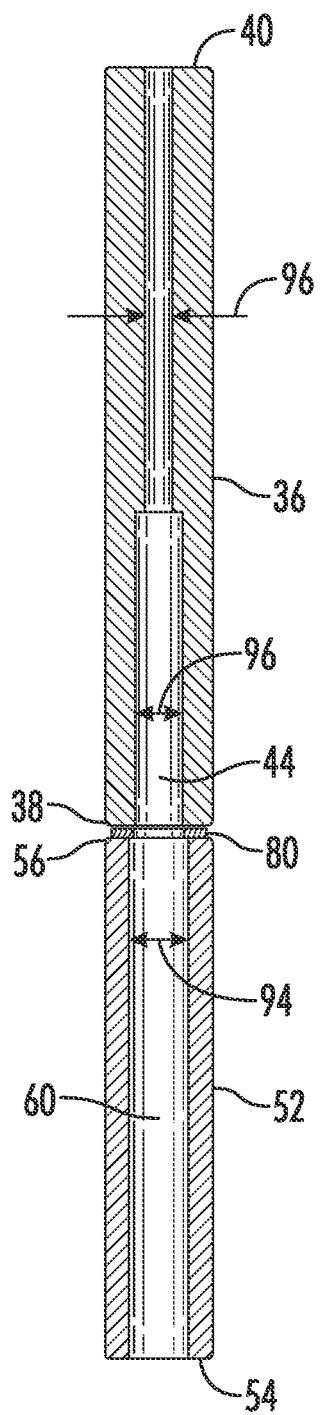
FIG. 11 illustrates a top perspective, cross-sectional view of the rear portion of the campfire roaster of FIG. 1 with the rod and longitudinal tube removed to show the rear handle channel and the forward handle channel.

Preferably, as best seen in FIG. 11, the rear handle channel 44 is wider at the rear handle forward end 38 as compared to the rear handle rear end 40, due to the fact that the longitudinal tube 64 only passes partially through the rear handle 36. Preferably, the longitudinal tube 64 is press fit into the wider portion of the rear handle channel 44. Preferably, the forward handle 52 and the rear handle 36 are generally tubular in shape. Preferably, the rod length 30 is at least 2 inches longer than the longitudinal tube length 70. Preferably, the forward handle channel width 94 is greater than the rear handle channel width 96 and the rear channel width 96 is preferably substantially the same size as the width of the longitudinal tube 64 so that rotation of the rear handle 36 rotates the longitudinal tube 64, and rotation of the longitudinal tube 64 in turn causes rotation of the attached prong(s) 18, which in turn causes rotation of the dispensing plate 74, which in turn causes rotation of the rod 24, and the longitudinal tube 64 does not cause the forward handle 52 to rotate because the forward handle channel 60 is wide enough to allow the longitudinal tube 64 to freely rotate within the forward handle channel 60.

The present disclosure further provides a method of roasting a food item 88 comprising: a) providing the campfire roaster 10; b) positioning a food item 88 on the at least one prong 18; and c) positioning the prong 18 and food item 88 over a fire. Preferably, the method further includes, after step c) (i.e., after cooking the food item 88), moving the knob 34 forwardly towards the rear handle 36 to move the rod 24 forwardly, to move the spring 48 from the relaxed length to the compressed length, and to move the dispensing plate 74 forwardly along the at least one prong 18 to remove the food item 88 from the at least one prong 18. Preferably, the method also includes the step of rotating the rear handle 36, (and as a result the longitudinal tube 64, the at least one prong 18, the dispensing plate 74 and preferably the rod 24) clockwise or counter-clockwise relative to the roaster length/longitudinal axis while keeping the forward handle 52 stationary to rotate the food item 88 in the fire.

Figure 12:
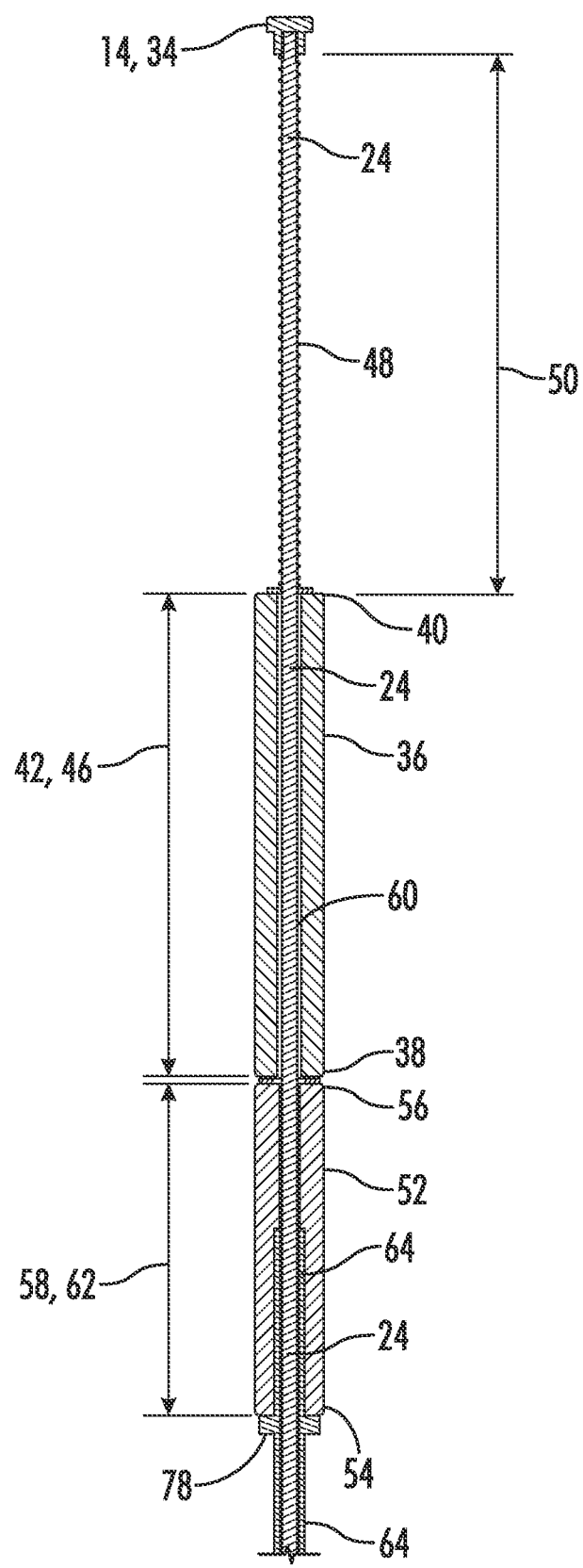
FIG. 12 illustrates a top perspective, cross-sectional view of the rear portion of a campfire roaster of an alternate embodiment of the present invention with the spring at the relaxed spring length.

The Alternate Embodiment of FIG. 12

FIG. 12 illustrates a campfire roaster 10 of an alternate embodiment of the present invention. In the embodiment of FIG. 12, the longitudinal tube 64 is press fit into the forward handle channel 60, the longitudinal tube 64 only passes partially through the forward handle channel 60, and the longitudinal tube 64 does not enter the rear handle channel 44. As a result, in the alternate embodiment of FIG. 12, the user rotates the forward handle 52 while keeping the rear handle 36 stationary and rotation of the forward handle 52 causes the longitudinal tube 64 to rotate and in turn the prong(s) 18, the dispensing plate 74 and the rod 24 to rotate so as to rotate the food item 88 in the fire.

| Part List | |
|---|---|
| Roaster | 10 |
| roaster forward end | 12 |
| roaster rear end | 14 |
| roaster length/longitudinal axis | 16 |
| prong | 18 |
| prong forward end | 20 |
| prong rear end | 22 |
| rod | 24 |
| rod forward end | 26 |
| rod rear end | 28 |
| rod length | 30 |
| rod width | 32 |
| knob | 34 |
| rear handle | 36 |
| rear handle forward end | 38 |
| rear handle rear end | 40 |
| rear handle length | 42 |
| rear handle channel | 44 |
| rear handle channel length | 46 |
| spring | 48 |
| spring length | 50 |
| forward handle | 52 |
| forward handle forward end | 54 |
| forward handle rear end | 56 |
| forward handle length | 58 |
| forward handle channel | 60 |
| forward handle channel length | 62 |
| longitudinal tube | 64 |
| longitudinal tube forward end | 66 |
| longitudinal tube rear end | 68 |
| longitudinal tube length | 70 |
| longitudinal tube channel | 72 |
| dispensing plate | 74 |
| dispensing plate aperture | 76 |
| forward flange | 78 |
| washer | 80 |
| washer aperture | 82 |
| curved rear segment | 84 |
| straight forward segment | 86 |
| food item | 88 |
| indicia on forward handle | 90 |
| indicia on rear handle | 92 |
| forward handle channel width | 94 |
| rear handle channel width | 96 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. In addition, the steps of the methods described herein can be performed in any suitable order, including simultaneously. It is understood that use of the singular embraces the plural and vice versa.

In the illustrated drawings, and as most clearly visible in FIG. 12, the rod width 32 is less than the width 96 of the rear handle channel 44 and the width 94 of the forward handle channel 60 (even at the narrowest portion of the rear handle channel 44 and forward handle channel 94) so that the rod 24 may move forwardly as previously described.

The invention claimed is:

1. A campfire roaster comprising:
a roaster forward end;
a roaster rear end;
a roaster length extending from the roaster forward end to the roaster rear end;
at least one prong, the at least one prong having a prong forward end adjacent to the roaster forward end and a prong rear end;
a rod having a rod forward end, a rod rear end, a rod length extending from the rod forward end to the rod rear end and parallel to the roaster length, and a rod width perpendicular to the rod length;
a knob located rearwardly relative to the rod rear end and adjacent to the roaster rear end;
a rear handle surrounding the rod, located forwardly relative to the knob and the rod rear end, the rear handle having a rear handle forward end, a rear handle rear end, a rear handle length extending from the rear handle forward end to the rear handle rear end and parallel to the roaster length, a rear handle width extending parallel to the roaster width, and a rear handle channel having a rear handle channel length extending from the rear handle forward end to the rear handle rear end and parallel to the roaster length, the rear handle channel having a maximum width and a minimum width, the rear handle channel maximum width and the rear channel minimum width extending parallel to the roaster width and less than the rear handle width, the rear handle channel maximum width greater than the rear channel minimum width, the rear handle channel maximum width located forwardly relative to the rear handle channel minimum width;
a spring located between the rear handle and the knob, the spring having a forward end abutting the rear handle rear end and a rear end abutting the knob, the spring surrounding the rod and having a relaxed length and a compressed length, the relaxed length and the compressed length generally parallel to the roaster length, the relaxed length greater than the compressed length;
a forward handle surrounding the rod, located forwardly relative to the rear handle and having a forward handle forward end, a forward handle rear end, a forward handle length extending from the forward handle forward end to the forward handle rear end and parallel to the roaster length, a forward handle width extending parallel to the roaster width, and a forward handle channel having a forward handle channel length extending from the forward handle forward end to the forward handle rear end and parallel to the roaster length and a forward handle channel width parallel to the roaster width, the forward handle channel width less than the forward handle width and greater than the rear handle channel maximum width;
a longitudinal tube surrounding the rod and comprising a longitudinal tube forward end located forwardly relative to the forward handle, a longitudinal tube rear end located in the rear handle channel between the rear handle forward end and the rear handle rear end, a longitudinal tube length extending from the longitudinal tube forward end to the longitudinal tube rear end and parallel to the roaster length, the longitudinal tube comprising a longitudinal tube channel receiving the rod;
a dispensing plate attached to the rod adjacent to the rod forward end and slideably mounted on the at least one prong, the dispensing plate having at least one aperture receiving the at least one prong, the dispensing plate located forwardly relative to the longitudinal tube, the dispensing plate not attached to the longitudinal tube, the dispensing plate oriented generally perpendicular to the roaster length and the at least one prong;
wherein the rod fully passes through the forward handle channel and the rear handle channel,
wherein the longitudinal tube passes partially through the rear handle channel and fully through the forward handle channel,
wherein the longitudinal tube rear end is press fit into the rear handle channel forwardly relative to the rear handle minimum width,
wherein the at least one prong is attached to the longitudinal tube,
wherein the rod length is greater than the longitudinal tube length and the rod passes fully through the longitudinal tube channel,
wherein the longitudinal tube comprises a forward flange abutting the forward handle forward end, the forward flange having a forward flange width parallel to the roaster width, the forward flange width greater than the forward handle channel width at the forward handle forward end, and
further wherein the forward handle is rotatably mounted on the longitudinal tube.

2. The campfire roaster of claim 1 wherein the longitudinal tube comprises a longitudinal tube rear width located at the longitudinal tube rear end, the longitudinal tube rear width greater than the rear handle channel minimum width and further wherein the longitudinal tube rear width is substantially the same size as the rear handle channel maximum width.

3. The campfire roaster of claim 1 further comprising a washer located between the forward handle and the rear handle and abutting the forward handle rear end and the rear handle forward end, the washer comprising a washer aperture, the longitudinal tube and rod positioned through the washer aperture.

4. The campfire roaster of claim 1 wherein the roaster comprises two prongs attached to opposite sides of the longitudinal tube and further wherein the rod is located between the two prongs.

5. The campfire roaster of claim 4 wherein the two prongs are located 180 degrees apart on the longitudinal tube and form a U-shape.

6. The campfire roaster of claim 4 wherein each prong comprises a curved rear segment attached to the longitudinal tube and a straight forward segment located forwardly relative to the curved rear segment, wherein the longitudinal tube, the rod and each prong from the curved rear segment to the straight forward segment of the respective prong are in a single plane.

7. The campfire roaster of claim 1 wherein the rod is moveable longitudinally within the longitudinal tube.

8. The campfire roaster of claim 1 wherein the distance from the prong forward end to the prong rear end of the at least one prong is greater than the difference between the spring collapsed length and the spring relaxed length.

9. The campfire roaster of claim 1 wherein the forward handle and the rear handle are tubular in shape.

10. The campfire roaster of claim 1 wherein the rear handle, the longitudinal tube, the at least one prong, the rod and the dispensing plate rotate together in a clockwise and counterclockwise fashion relative to the roaster length.

11. The campfire roaster of claim 1 wherein the rod length is at least 2 inches longer than the longitudinal tube length.

12. The campfire roaster of claim 1 wherein the prong rear end is attached to the longitudinal tube.

13. A method of roasting a food item comprising:
a) providing the campfire roaster of claim 1;
b) positioning a food item on the at least one prong; and
c) positioning the food item over a fire.

14. The method of claim 13 further comprising, after step c), moving the knob forwardly towards the rear handle to move the rod forwardly, move the spring from the relaxed length to the compressed length, and move the dispensing plate forwardly along the at least one prong to remove the food item from the at least one prong.

15. The method of claim 13 further comprising the step of rotating the rear handle, the longitudinal tube, the at least one prong, and the dispensing plate clockwise or counterclockwise relative to the roaster length while keeping the forward handle stationary.

16. A campfire roaster comprising:
a roaster forward end;
a roaster rear end;
a roaster length extending from the roaster forward end to the roaster rear end;
at least one prong, the at least one prong having a prong forward end adjacent to the roaster forward end and a prong rear end;
a rod having a rod forward end, a rod rear end, a rod length extending from the rod forward end to the rod rear end and parallel to the roaster length, and a rod width perpendicular to the rod length;
a knob located rearwardly relative to the rod rear end and adjacent to the roaster rear end;
a rear handle surrounding the rod, located forwardly relative to the knob and the rod rear end, the rear handle having a rear handle forward end, a rear handle rear end, a rear handle length extending from the rear handle forward end to the rear handle rear end and parallel to the roaster length, a rear handle width extending parallel to the roaster width, and a rear handle channel having a rear handle channel length extending from the rear handle forward end to the rear handle rear end and parallel to the roaster length;
a spring located between the rear handle and the knob, the spring having a forward end abutting the rear handle rear end and a rear end abutting the knob, the spring surrounding the rod and having a relaxed length and a compressed length, the relaxed length and the compressed length generally parallel to the roaster length, the relaxed length greater than the compressed length;
a forward handle surrounding the rod, located forwardly relative to the rear handle and having a forward handle forward end, a forward handle rear end, a forward handle length extending from the forward handle forward end to the forward handle rear end and parallel to the roaster length, a forward handle width extending parallel to the roaster width, and a forward handle channel having a forward handle channel length extending from the forward handle forward end to the forward handle rear end and parallel to the roaster length, the forward handle channel having a maximum width and a minimum width, the forward handle channel maximum width and the forward channel minimum width extending parallel to the roaster width and less than the forward handle width, the forward handle channel maximum width greater than the forward channel minimum width, the forward handle channel maximum width located forwardly relative to the forward handle channel minimum width;
a longitudinal tube surrounding the rod and comprising a longitudinal tube forward end located forwardly relative to the forward handle, a longitudinal tube rear end located in the forward handle channel between the forward handle forward end and the forward handle rear end, a longitudinal tube length extending from the longitudinal tube forward end to the longitudinal tube rear end and parallel to the roaster length, the longitudinal tube comprising a longitudinal tube channel receiving the rod;
a dispensing plate attached to the rod adjacent to the rod forward end and slideably mounted on the at least one prong, the dispensing plate having at least one aperture receiving the at least one prong, the dispensing plate located forwardly relative to the longitudinal tube, the dispensing plate not attached to the longitudinal tube, the dispensing plate oriented perpendicular to the roaster length and the at least one prong;
wherein the rod fully passes through the forward handle channel and the rear handle channel,
wherein the longitudinal tube passes partially through the forward handle channel,
wherein the longitudinal tube is press fit into the forward handle channel forwardly relative to the forward handle minimum width,
wherein the at least one prong is attached to the longitudinal tube, and further wherein the rod length is greater than the longitudinal tube length and the rod passes fully through the longitudinal tube channel.

17. The campfire roaster of claim 16 wherein the forward handle, the longitudinal tube, the at least one prong, the rod and the dispensing plate rotate together in a clockwise and counterclockwise fashion relative to the roaster length.

18. The campfire roaster of claim 16 wherein the distance from the prong forward end to the prong rear end of the at least one prong is greater than the difference between the spring collapsed length and the spring relaxed length.

19. The campfire roaster of claim 16 wherein the roaster comprises two prongs attached to opposite sides of the longitudinal tube, wherein the rod is located between the two prongs, and further wherein the two prongs are located 180 degrees apart and form a U-shape.

20. The campfire roaster of claim 16 wherein the rod is moveable longitudinally within the longitudinal tube.

* * * * *